United States Patent
Day

[15] 3,688,877
[45] Sept. 5, 1972

[54] DEVICE FOR RELEASING A SPRING URGED BRAKE

[72] Inventor: Michael D. Day, Minneapolis, Minn.

[73] Assignee: Horton Manufacturing Company, Inc., Minneapolis, Minn.

[22] Filed: Nov. 4, 1970

[21] Appl. No.: 86,862

[52] U.S. Cl....................................188/166, 188/170
[51] Int. Cl......................B60t 13/104, F16d 65/24
[58] Field of Search..........188/68, 69, 166, 170, 171, 188/73.2; 192/90, 91 A

[56] References Cited

UNITED STATES PATENTS

| | | | |
|---|---|---|---|
| 2,349,132 | 5/1964 | Baird | 188/170 UX |
| 3,003,587 | 10/1961 | Garrett | 188/69 X |
| 3,441,110 | 4/1969 | Ruggen | 188/170 |

*Primary Examiner*—Duane A. Reger
*Attorney*—Wicks & Nemer

[57] ABSTRACT

A brake including a braking member slidable within a fixed housing and on a support member secured to a shaft and engageable with a friction member connected to the housing, the friction member engageable with a stop member fixed to the support member for braking the shaft, the improvement in the connection of the friction member with the housing including a ring carried by the housing with spline means connecting the ring to the friction member and a pin carried by the housing for releasable engagement with a notch in the ring to allow braking or prevent braking of the braking member relative to the shaft.

7 Claims, 3 Drawing Figures

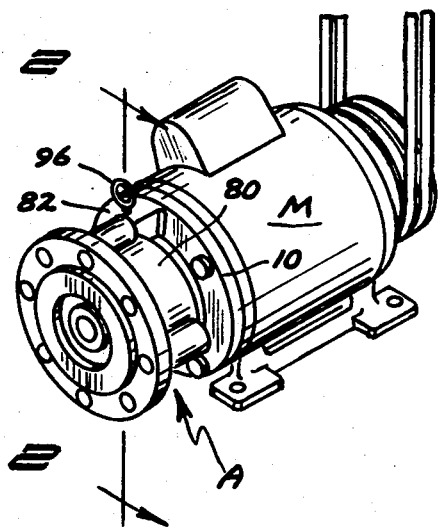
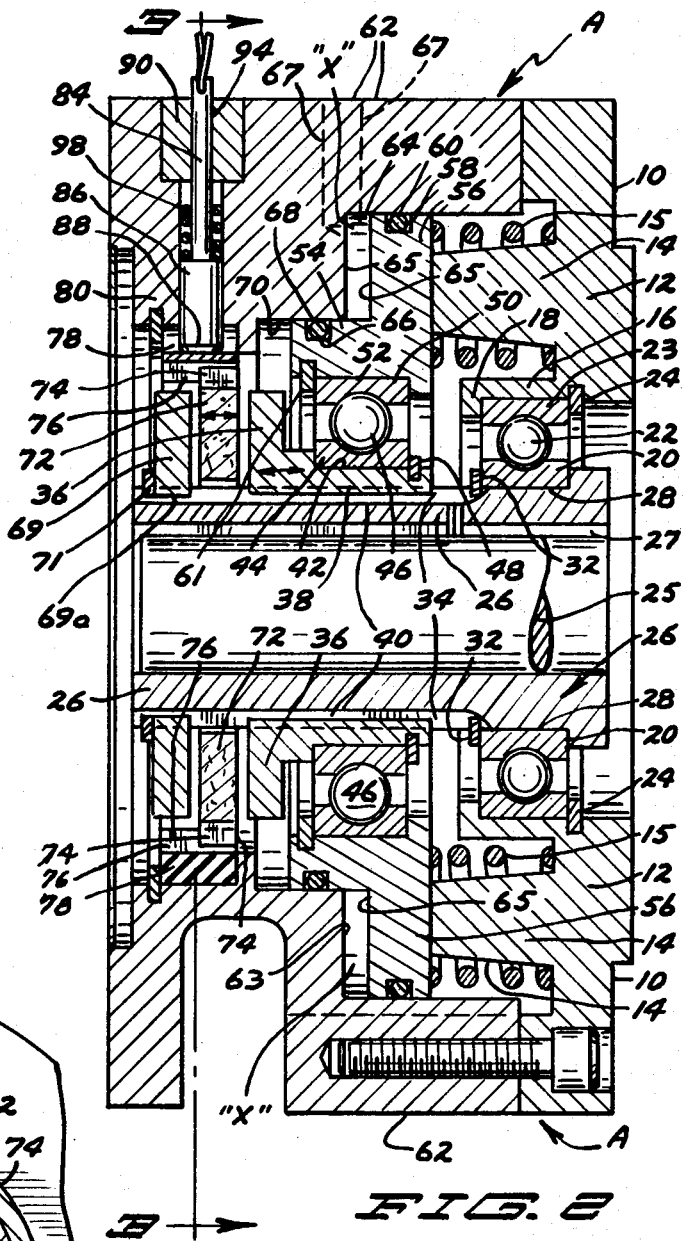

DEVICE FOR RELEASING A SPRING URGED BRAKE

SUMMARY OF THE INVENTION

The invention relates to an improvement in brakes which are spring engaged and disengaged with fluid pressure. In the use of a brake with a motor for driving a device a loss of electrical power gives a loss of fluid pressure. As a result of the loss of liquid pressure due to a loss of power or just the loss of liquid pressure there is spring engagement of the braking members which brakes the motor and any device the motor is driving. With the present invention, the brake may be manually released by releasing a pin connected to a friction ring which allows the motor shaft to rotate as desired. The brake is re-engaged by re-engaging the pin.

In the drawings forming part of this application:

FIG. 1 is a perspective view of a device for releasing a brake with spring engagement and fluid pressure release embodying the invention and attached to a shaft of a double shaft electric motor used in driving a device not shown.

FIG. 2 is a sectional view on the line 2—2 of FIG. 1, portions thereof being broken away.

FIG. 3 is a sectional view on the line 3—3 of FIG. 2.

Referring to the drawings in detail, the letter A designates a brake with spring engagement and fluid pressure release, and the letter B designates a release mechanism for releasing the brake upon a loss of fluid brake pressure due to a loss of power supplying the fluid pressure.

The brake A includes the spring housing 10 which includes the annular base 12 and extending inwardly from the base 12 are a plurality of spaced lobes 14. Extending from the base 12 is the annular flange portion 16 which terminates in the right angular shoulder 18. Positioned on the flange 16 and against the shoulder 18 is the inner race 20 of the bearing 22, the outer race 23 held in position by the retaining ring 24 mounted in a groove formed in the annular base.

The numeral 26 designates a hub in which the shaft 25 of the motor M is secured by means of a key in the key way 27. Mounted on a recess 28 formed on the end of the hub is the inner race 20 of the bearing 22. The inner race 20 is secured in position by means of the retaining ring 32. The hub 26 is formed with the splines 34 on which the splined friction flange 36 is slidably mounted, the friction flange formed as part of the cylindrical base 38 also formed with splines 40.

The cylindrical base 38 is formed with the annular recess 42 in which the inner race 44 of the bearing 46 is fit. The inner race 44 is held in position by the retaining ring 48. The outer race 50 of the bearing 46 is fit in the recess 52 of the annular piston 54. Extending radially from the piston 54 is the annular wall 56 with the annular groove 58 in which is positioned the O-ring 60. The race 50 is held in place by the retaining ring 61.

The numeral 62 designates an annular housing formed with the first annular recess 64 in which the wall 56 of the piston 54 moves with the O-ring 60 in sealing contact with the surface of the recess 64. The annular space as at "X" between the wall face 63 of the housing 62 and the wall face 65 of the wall extension 56 of the piston 54 forms a cylinder in which fluid pressure is introduced by supply line 67. The piston 54 has formed therein the groove 66 in which the O-ring 68 is positioned. The housing 62 has formed therein the second annular recess 70 within which the piston moves with the O-ring 68 in sealing contact with the surface of the recess 70.

Further provided is the friction ring 72 which is formed with the outer splines 74. The ring 72 is concentric with the hub 26 and the splines 74 engage with the splines 76 of the lock ring 78 concentric therewith and mounted within the circular housing member 80. Positioned on each of the lobes 14 is a coil spring 15 between the base 12 and the piston wall 56 thereby urging the piston 54 and the friction flange 36 upon the friction ring 72 which is moved into braking contact with the friction plate 69 formed with the internal splines 69a which are in engagement with the splines of the hub 26. The ring 69 is prevented from moving axially when contacted by the friction ring 72 by the retainer ring 71. The housing member 80 has formed thereon the radially extended extension 82 in which is formed the bore 84.

The pin 86 is provided and positioned in the bore 84, and the inner end of the pin 86 is engageable with and removable from a notch 88 formed in the lock ring 78. At the outer end of the bore 84 is secured the plug 90 in the extension 82. The plug 90 is formed with the bore 92 in which is slidably mounted the pin shank 94 on the outer end of which is mounted the pull ring 96. The numeral 98 designates a coil spring mounted on the pin shank 94 between the plug 90 and the pin 86 thereby urging the pin 86 into engagement with the notch 88 of the ring 78.

In the operation of the device relative to the motor M let it be assumed that the shaft of the motor is rotating which rotates the hub 26 upon the bearings 22 and 46. The pin 86 is in engagement with the notch 88 of the ring 78. So that the shaft of the motor may rotate and not be braked, fluid pressure is maintained iq the cylinder area "X" which maintains the friction flange 36 out of contact with the friction ring 72. With a loss of power and resultant loss of fluid pressure in cylinder area "X", the springs 15 urge the piston 54 and the friction flange 36 carried thereby into pressure contact with the friction ring 72 thereby moving it axially into pressure contact with the stop ring 69. Such action brakes the shaft of the motor and anything it is driving due to the fact that the friction ring 72 is splined to the lock ring 78 with outer splines 74 of the friction ring 72 and splines 76 of the lock ring 78 which is pinned to the stationary housing 62 by pin 86. With the pin 86 in place in the notch 88 it is the only torque carrying member when the brake comes on. With the removal of the pin 86 from the notch 88 the ring 78, friction flange 36, friction ring 72 and stop ring 69 are free to rotate and thereby allow the hub 26 to rotate which no longer brakes the motor shaft. The shaft may then be rotated. Thus, when the brake is "on" by reason of the action of the springs 15 the brake may be released by pulling the pin 86 as described above.

A brake having the present invention can be used in installations other than that of FIG. 1 such as with the brake on a C-face motor or on a through shaft or single shaft motor. It may also be interposed between a gear reducer and an electric motor.

I claim:

1. In a device having a braking member slidable within a fixed housing and on a support member secured to a shaft and engageable with a friction member connected to the housing, said friction member engageable with a stop member connected to the support member for braking the shaft, the improvement in the connection of the friction member with the housing, said improvement including
   a. means for releasably connecting the friction member to the housing including
   b. a lock ring carried by said housing,
   c. means connecting said ring to said friction member,
   d. an extension slidable in said housing,
   e. said lock ring having means for receiving said extension and
   f. means for moving said slidable extension into and out of engagement with said receiving means of said lock ring to allow braking or prevent braking of said braking member.

2. The device of claim 1 in which said extension is a pin.

3. The device of claim 2 in which said extension receiving means of said ring is a notch for receiving said pin.

4. The device of claim 1 in which said means connecting said lock ring to said friction member includes complementary splines formed in said ring and said friction member.

5. The device of claim 4 in which said means on said lock ring for receiving said extension is a notch.

6. The device of claim 3 in which said means connecting said lock ring to said friction member includes complementary splines formed in said lock ring and said friction member.

7. The device of claim 1 in which said lock ring is concentric with said friction member and radially disposed thereto.

* * * * *